(No Model.)
J. C. RICE.
THREE HORSE EQUALIZER.
No. 503,163. Patented Aug. 15, 1893.
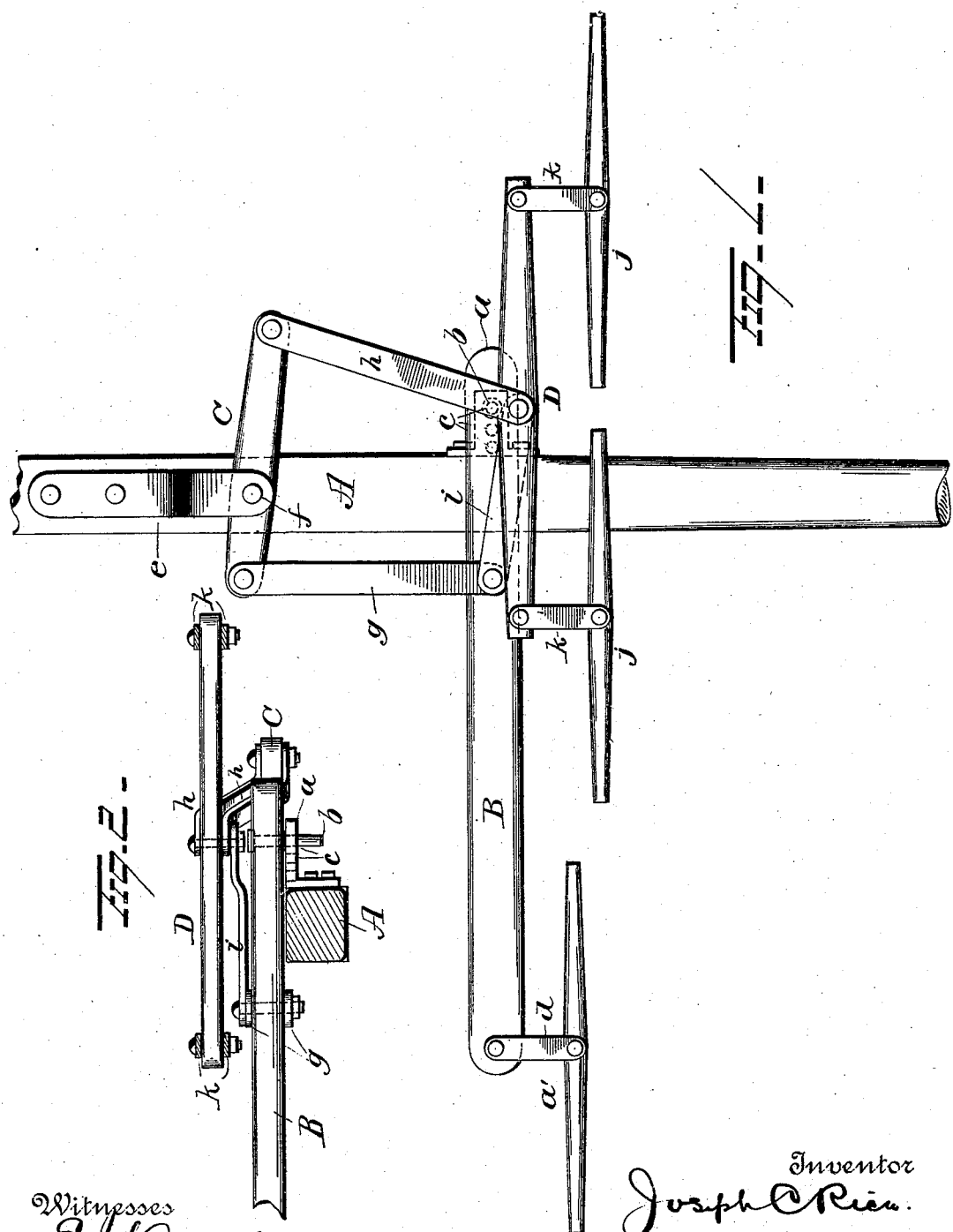
Witnesses
E. T. Nottingham
G. F. Downing
Inventor
Joseph C. Rice.
By H. A. Symons
Attorney

UNITED STATES PATENT OFFICE.

JOSEPH C. RICE, OF GRUNDY CENTRE, IOWA.

THREE-HORSE EQUALIZER.

SPECIFICATION forming part of Letters Patent No. 503,163, dated August 15, 1893.

Application filed November 17, 1892. Serial No. 452,334. (No model.)

*To all whom it may concern:*

Be it known that I, JOSEPH C. RICE, of Grundy Centre, in the county of Grundy and State of Iowa, have invented certain new and useful Improvements in Three-Horse Equalizers; and I do hereby declare the following to be a full, clear, and exact description of the invention, such as will enable others skilled in the art to which it appertains to make and use the same.

My invention relates to an improvement in three horse equalizers and it consists in certain features of construction and combinations of parts which will be hereinafter described and pointed out in the claims.

In the accompanying drawings, Figure 1 is a plan view of my improvement, and Fig. 2 is a sectional view.

A represents a pole or tongue.

B is an evener and C is an equalizing bar pivoted to the pole or tongue by means of a bolt $f$ passing through a hole in the strap $e$ and through one formed in the pole or tongue. Evener B is capable of lateral adjustment and this adjustment is made possible by a bracket $a$ which is secured at one side of the pole or tongue. This bracket projects out laterally, its upper face being preferably flush with the top of the pole or tongue, and this portion of the bracket is provided with a number of holes $c, c$. A pin $b$ is inserted through a hole in one end of the evener and one of the holes $c$ whereby to hold the evener pivotally in place. The pin $b$ may be placed in any one of the holes $c$ and in this manner the position of the evener and any connected parts may be changed slightly to regulate the position of the whiffletrees.

D is a whiffletree and the manner of connecting this whiffletree with the evener and equalizing bar is as follows: A pair of draft bars $g, g$, and $h, h$, are pivotally connected respectively with the short and long arms of the equalizing bar C at their rear ends, the draft bars being arranged on each side of the equalizing bars. The draft bars $g, g$, extend forward and are pivoted at their forward ends by a single bolt, to the evener B and the two draft bars $h, h$, extend forward in a similar manner and are pivotally connected by a single bolt with the doubletree D. Thus it will be seen that while draft bars $g, g$, are directly pivoted to the evener B the draft bars $h, h$, are entirely disconnected therefrom and independent thereof. There is a connection however between the whiffletree by means of a link or connecting bar $i$ which is pivotally connected at one end with the evener preferably by means of the same bolt which connects the forward ends of draft bars $g, g$, with the evener, and at the other end this link or connecting bar is pivotally connected with the whiffletree, preferably by the same bolt which connects the draft bars $h, h$, thereto.

In addition to the parts described singletree $j, j$, is connected with the ends of whiffletree D by straps $k, k$, and singletree $a'$ is connected with the free end of evener B by means of one or more straps $d$.

It is evident that slight changes might be resorted to in the form and arrangement of the several parts described without departing from the spirit and scope of my invention and hence I do not wish to limit myself to the exact construction herein set forth, but, Having fully described my invention, what I claim as new, and desire to secure by Letters Patent, is—

1. The combination with a pole, an evener, and an equalizing bar both pivotally connected with the pole, of a whiffletree, a pair of draft bars, one pivotally connected with the equalizing bar on each side of the latter's pivot, one draft bar pivotally connected with the evener and the other pivotally connected with the whiffletree, and a connecting bar or link pivotally connected with the evener and whiffletree, substantially as set forth.

2. The combination with a pole, and an evener adjustably pivoted to the pole, of an equalizing bar, a whiffletree, draft bars pivotally connecting the evener and the whiffletree with the opposite ends of the equalizing bar, and a connecting bar or link pivotally connecting the evener and whiffletree together, substantially as set forth.

In testimony whereof I have signed this specification in the presence of two subscribing witnesses.

JOSEPH C. RICE.

Witnesses:
J. A. BELKNAP,
PAUL C. AKIN.